(12) United States Patent
Hogg et al.

(10) Patent No.: US 8,516,436 B2
(45) Date of Patent: Aug. 20, 2013

(54) ENCAPSULATING A GRAPHICAL PROGRAM WITHIN A STANDARD IMAGE FILE

(75) Inventors: Simon Anthony Hogg, Austin, TX (US); J. Wesley Reynolds, Jr., Austin, TX (US)

(73) Assignee: National Instruments Corporation, Austin, TX (US)

(*) Notice: Subject to any disclaimer, the term of this patent is extended or adjusted under 35 U.S.C. 154(b) by 1055 days.

(21) Appl. No.: 12/533,168

(22) Filed: Jul. 31, 2009

(65) Prior Publication Data

US 2011/0010688 A1 Jan. 13, 2011

Related U.S. Application Data

(60) Provisional application No. 61/224,634, filed on Jul. 10, 2009.

(51) Int. Cl.
*G06F 9/45* (2006.01)

(52) U.S. Cl.
USPC .......................................................... 717/105

(58) Field of Classification Search
USPC .......................................................... 717/105
See application file for complete search history.

(56) References Cited

U.S. PATENT DOCUMENTS

| | | | |
|---|---|---|---|
| 4,914,568 A | 4/1990 | Kodosky et al. | |
| 5,481,741 A | 1/1996 | McKaskle et al. | |
| 6,173,438 B1 | 1/2001 | Kodosky et al. | |
| 6,219,628 B1 | 4/2001 | Kodosky et al. | |
| 6,259,428 B1* | 7/2001 | Ramchandani et al. | 345/589 |
| 6,331,864 B1* | 12/2001 | Coco et al. | 715/763 |
| 7,210,117 B2 | 4/2007 | Kudukoli et al. | |
| 2005/0257194 A1* | 11/2005 | Morrow et al. | 717/109 |
| 2008/0066053 A1* | 3/2008 | Ramamoorthy et al. | 717/114 |
| 2009/0123027 A1* | 5/2009 | Moroo et al. | 382/100 |

OTHER PUBLICATIONS

"An Introduction to PNG (PNG: The Definitive Guide)"; Chapter 1. An Introduction to PNG; O'Reilly & Associates; Jan. 1, 2001. 20 pages. Obtained from Internet: <http://www.libpng.org/pub/png/book/chapter01.html>.

"Spore's .png Format (Illustrated)"; Rouli.net; Aug. 4, 2008; 6 pages. Obtained from Internet: <http://www.rouli.net/2008/08/spores-png-format-illustrated.html>.

* cited by examiner

*Primary Examiner* — John Chavis
(74) *Attorney, Agent, or Firm* — Meyertons Hood Kivlin Kowert & Goetzel, P.C.; Jeffrey C. Hood; Jason L. Burgess

(57) ABSTRACT

A system and method for encapsulating a graphical program within an image or other object are described. Graphical program information representing the graphical program may be stored within the image. The graphical program information may specify a plurality of interconnected nodes of the graphical program. In addition to the graphical program information, the image also includes pixel information for displaying the image. The image may subsequently be provided to a graphical programming development environment. The graphical programming development environment may retrieve the graphical program information from the image and use the graphical program information to automatically instantiate an editable, executable version of the graphical program.

24 Claims, 14 Drawing Sheets

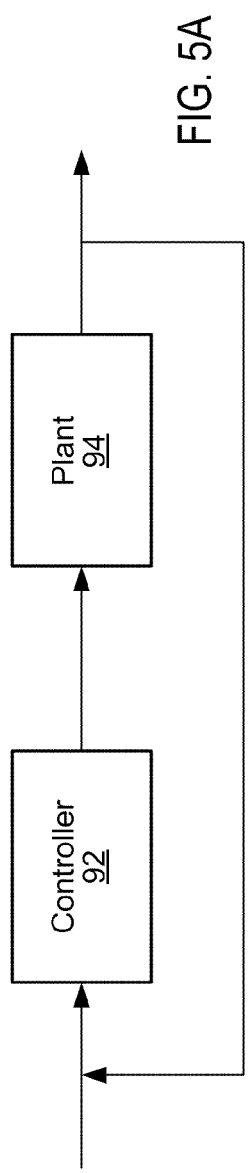
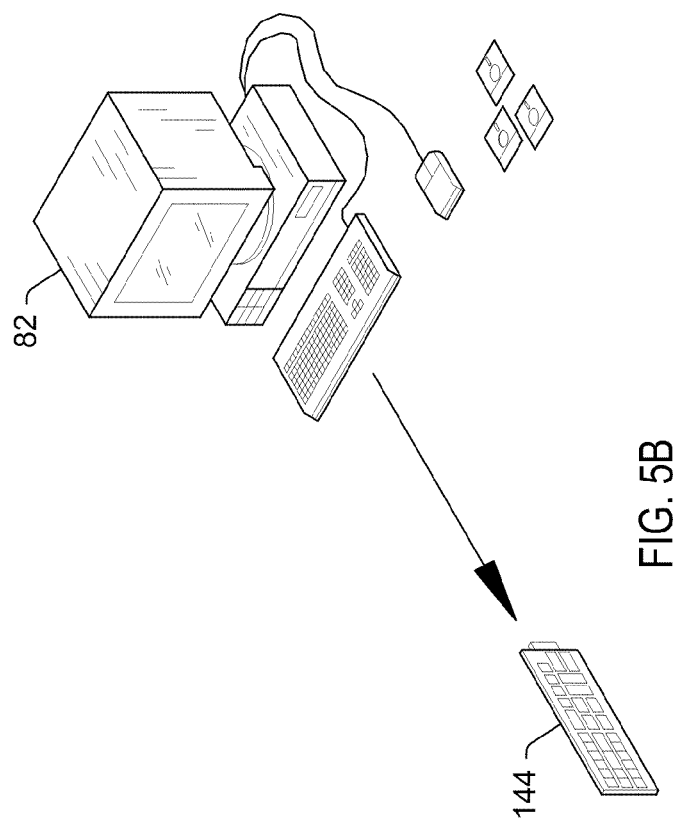
FIG. 5A
FIG. 5B

ENCAPSULATING A GRAPHICAL PROGRAM WITHIN A STANDARD IMAGE FILE

PRIORITY CLAIM

This application claims priority to U.S. provisional patent application No. 61/224,634, titled, "Encapsulating a Graphical Program within a Standard Image File", filed on Jul. 10, 2009, whose inventors were Simon Anthony Hogg and J. Wesley Reynolds, Jr. and which is hereby incorporated by reference in its entirety as though fully and completely set forth herein.

FIELD OF THE INVENTION

The present invention relates to the field of graphical programming, and more particularly to a system and method for encapsulating a graphical program within a standard image file or other file such as a document file, e.g., in order to facilitate transfer and display of the graphical program.

DESCRIPTION OF THE RELATED ART

Traditionally, text-based programming languages have been used by programmers in writing application programs. Many different text-based programming languages exist, including BASIC, C, C++, Visual C++, Java, FORTRAN, Pascal, COBOL, ADA, APL, etc. Increasingly, computers are required to be used and programmed by those who are not highly trained in computer programming techniques. When traditional text-based programming languages are used, the user's programming skills and ability to interact with the computer system often become a limiting factor in the user's efficiency of creating a computer program.

Various programming models and paradigms that enable a user to create a program in a graphical manner without necessarily writing source code in a text-based programming language have been developed. In particular, graphical programming development environments enable a user to create a software program by including a plurality of nodes or icons in a block diagram and interconnecting the nodes or icons, e.g., such that the interconnected plurality of nodes or icons visually indicates functionality of the resulting software program (called a "graphical program"). The resulting interconnected nodes may visually indicate a function or process performed by the graphical program during its execution.

Graphical programming has become a powerful tool available to programmers. Graphical programming development environments such as National Instruments Corp.'s LabVIEW product have become very popular. Tools such as LabVIEW have greatly increased the productivity of programmers, and increasing numbers of programmers are using graphical programming development environments to develop their software applications. In particular, graphical programming tools are being used for applications such as test and measurement, data acquisition, process control, man machine interface (MMI), supervisory control and data acquisition (SCADA) applications, modeling, simulation, image processing/machine vision applications, and motion control, among others.

A graphical program created by a particular graphical programming development environment is typically packaged into or saved as one or more files formatted according to a specialized or proprietary file format used by the particular graphical programming development environment. The graphical program file(s) created by the graphical programming development environment may include various data structures or other information describing the graphical program, e.g., data structures which specify the nodes included in the graphical program, the configuration of each node, the interconnections among nodes, etc. Some general purpose software programs such as word processors, web browsers, etc. may not be able to use the graphical program files created by a graphical programming development environment because they do not possess knowledge of the specialized file structure. Thus, these programs may not be able to read the data structures or information describing the graphical program from the graphical program file. Furthermore, even if these programs were able to read the data structures or information describing the graphical program from the graphical program file, they still often do not possess the knowledge that would allow them to use the data structures or information to display the plurality of interconnected nodes of the graphical program. Thus, graphical program files are essentially "black boxes" to many software applications other than the graphical programming development environment application which originally creates the graphical program files, such that the graphical programs contained in the graphical program files often cannot be displayed by applications other than the graphical programming development environment itself.

SUMMARY

Various embodiments of a system and method for encapsulating a graphical program within an image or other object are described herein. The graphical program includes a plurality of interconnected nodes visually indicating functionality of the graphical program. According to some embodiments of the method, first user input requesting to encapsulate the graphical program within an image may be received. In response to the first user input, graphical program information representing the graphical program may be stored within the image. The graphical program information may specify the plurality of interconnected nodes of the graphical program. In addition to the graphical program information, the image also includes pixel information for displaying the image. The method may further comprise storing the image in one or more image files by storing the pixel information for displaying the image in the one or more image files, and also storing the graphical program information representing the graphical program in the one or more image files.

In further embodiments of the method, second user input providing the image to a graphical programming development environment may be received. In response to the second user input, the graphical program information representing the graphical program may be retrieved from the image. The plurality of interconnected nodes of the graphical program may then be included or instantiated in a block diagram editor of the graphical programming development environment using the graphical program information. Including the plurality of interconnected nodes of the graphical program in the block diagram editor may enable a user to edit and/or execute the plurality of interconnected nodes of the graphical program.

BRIEF DESCRIPTION OF THE DRAWINGS

A better understanding of the invention can be obtained when the following detailed description is considered in conjunction with the following drawings, in which:

FIGS. 5A and 5B illustrate examples of systems which may execute or utilize graphical programs created by the computer systems of FIG. 1 or FIG. 2 in some embodiments;

Figure 1:
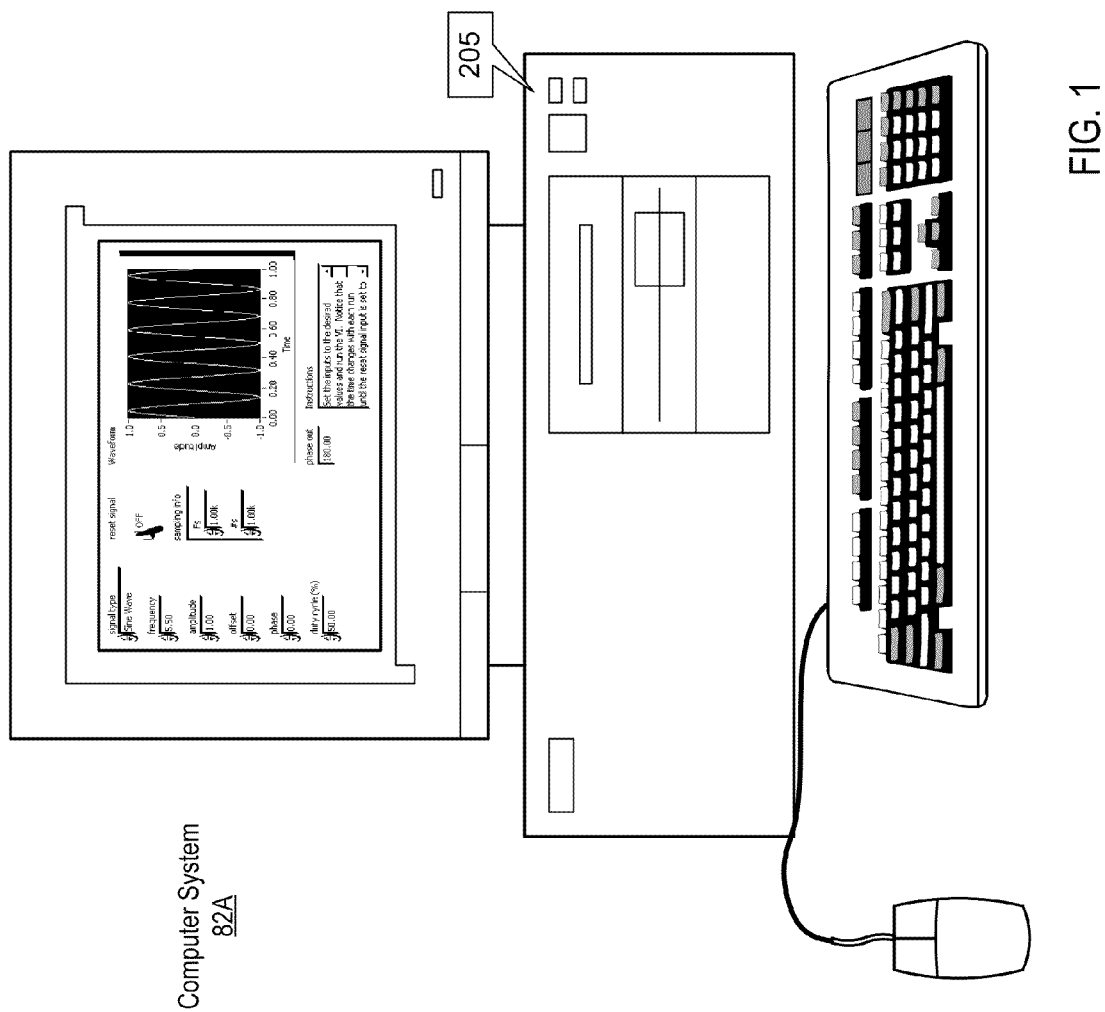
FIG. 1 illustrates an example of a computer system configured to execute software that implements a graphical programming development environment which includes a feature enabling a user to request the graphical programming development environment to automatically encapsulate a graphical program within an image or other object.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EXEMPLARY EMBODIMENTS

Incorporation by Reference:

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Encapsulating a Graphical Program Within an Image or Document

Various embodiments of a system and method for encapsulating a graphical program within an image are described herein. Encapsulating a graphical program within an image may facilitate transfer of the graphical program to other computer systems and may enable a block diagram of the graphical program to in effect be displayed by software applications other than the graphical programming development environment used to create the graphical program.

For example, a first user of a first computer system may interact with a graphical programming development environment executing on the first computer system to create the graphical program. For example, the user may use a block diagram editor of the graphical programming development environment to create a block diagram for the graphical program by selecting various nodes provided by the graphical programming development environment and interconnecting the nodes such that the interconnected nodes displayed within the block diagram editor visually indicate functionality that the graphical program will perform when executed.

The first user may then request the graphical programming development environment to encapsulate the graphical program within an image. In some embodiments the image may be created according to a standard image format commonly displayable by typical software applications installed on most computer systems, such as standard web browsers, email viewers, word processors, etc. For example, in some embodiments the image may be a Portable Network Graphics (PNG) image. The image created by the graphical programming development environment may include both pixel information for displaying the image and graphical program information representing the graphical program. The graphical program information included in the image may specify which nodes are included in the graphical program, the configuration of the nodes, the interconnections among the nodes, and/or any of various other information that describes or represents the graphical program.

The first user may then provide the image which includes the graphical program information to a second user of a second computer system. As one example, the first user may post a web page on a web server or post a message on an Internet message forum and may include the image in the web page or message to make the image available for download and viewing by the second user (and possibly other users). As another example, the first user may send the second user an email message or a document which includes the image.

The second user may then download the image, e.g., by downloading the web page, message, or email using a software application such as a web browser or email client. The web browser or other software application used to download the image may use the pixel information of the image to display the image on a display device of the second computer system in the manner that normal images are commonly displayed. In some embodiments the graphical program information included within the image may simply be ignored by the web browser or other software application which downloads the image.

In some embodiments the graphical programming development environment may create the pixel information of the image in such a way that when the pixel information is displayed by the web browser or other software application, the image has an appearance substantially similar to or identical to the appearance of the graphical program's block diagram when it is displayed in the graphical programming development environment. This may enable the second user to see the nodes of the graphical program and see how they are interconnected by viewing the image within the web browser or other software application.

The second user may then desire to edit or execute the graphical program. In order to do so the second user may provide the image to an instance of the graphical programming development environment executing on the second computer system used by the second user. For example, in some embodiments the user may drag-and-drop the image from the web browser or other software application into the graphical programming development environment. In other embodiments the user may first save the image to an image file on the second computer system, and may then request the graphical programming development environment to open the image file.

In response to receiving the image, the graphical programming development environment may analyze the image to determine that it includes the graphical program information which represents the graphical program. The graphical programming development environment may then extract the graphical program information from the image and use the graphical program information to instantiate the graphical program in a block diagram editor. The second user can then interact with the block diagram editor to edit the graphical program or to request that the graphical program be executed.

Thus, some embodiments of the method may facilitate the convenient transfer of a graphical program from one user to another by transferring an image which includes graphical program information representing the graphical program.

Embodiments of the method may also provide a convenient way for a user to create an image having an appearance substantially similar to the appearance of the block diagram of the graphical program, e.g., by requesting the graphical programming development environment to automatically create the image. The image may be created according to a standard image format in order to enable standard web browsers and other software applications which typically cannot display graphical program block diagrams to display an image which appears substantially similar to the graphical program block diagram. (Many graphical programming development environments package graphical programs into a specialized or proprietary file format which software applications other than the graphical programming development environment used to create the graphical programs cannot read.) The user who creates the image can share the image with other users, allowing the other users to not only display the image using web browsers or other standard software applications, but also provide the image as input to instances of the graphical programming development environment running on their respective computer systems in order to instantiate or create an editable and executable version of the graphical program on their respective computer systems.

Other embodiments of the method are also contemplated. For example, images which encapsulate graphical programs may be useful in help documentation provided by the graphical programming development environment. For example, the developers of the graphical programming development environment may create help documentation which includes images showing users of the graphical programming development environment which nodes should be included in a graphical program and how the nodes should be interconnected in order to accomplish a particular function. When viewing the help documentation a user may desire to use the graphical program code illustrated in the help window or help documentation in the user's own program. In order to do so, the user may simply drag-and-drop the image(s) illustrating and encapsulating the graphical program information from the help window or help document into the block diagram editor of the graphical programming development environment. The graphical programming development environment may then extract the information representing the graphical program and use it to create the nodes of the graphical program within the block diagram editor so that the user can then edit or execute the nodes as desired.

In further embodiments a graphical program may be encapsulated within other types of objects or files that can be handled by common software applications, such as within document files for example. Examples are described below of encapsulating graphical program information within a document file, where the encapsulated graphical program information is useable to instantiate a graphical program within a graphical programming development environment.

FIG. 1 illustrates an example of a computer system 82A configured to execute software 205 that implements a graphical programming development environment. The graphical programming development environment may enable a user to create, edit, and execute a graphical program. The computer system 82A may include a display device or monitor operable to display the block diagram of the graphical program as the graphical program is being created and/or executed. In some embodiments the graphical programming development environment may also include a feature enabling the user to request the graphical programming development environment to automatically encapsulate the graphical program within an image, e.g., by embedding graphical program information representing the graphical program within the image. For convenience, an image which encapsulates a graphical program is referred to herein as an "enhanced image".

Figure 2:
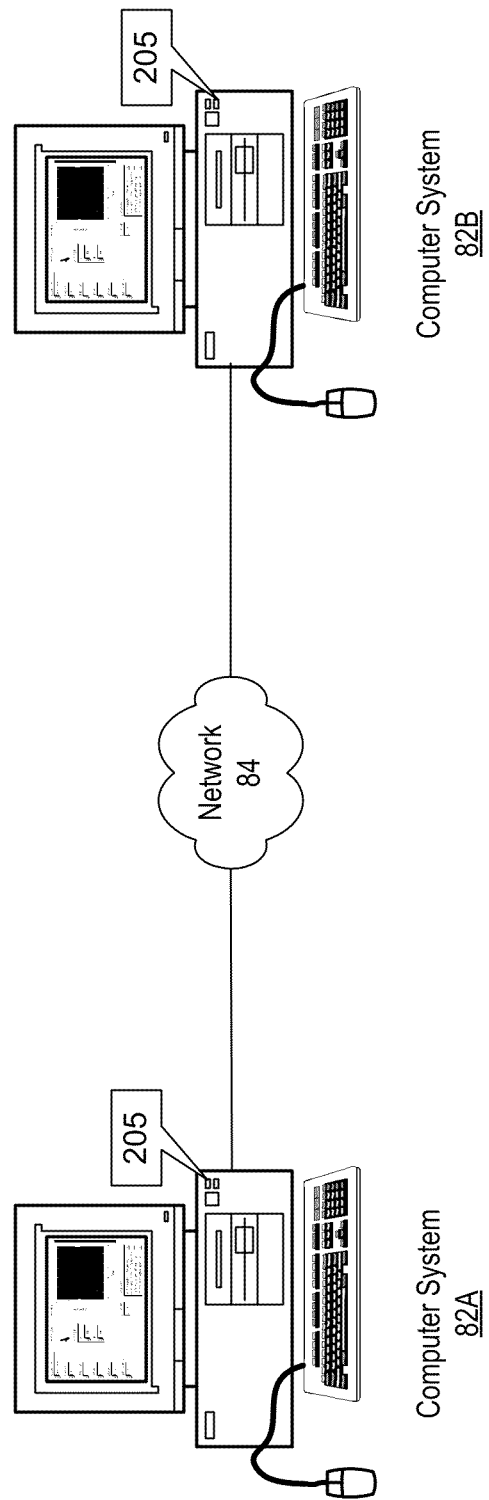
FIG. 2 illustrates an example in which the computer system of FIG. 1 is coupled to another computer system through one or more networks, and provides the image which encapsulates the graphical program to the other computer system.

As illustrated in FIG. 2, the computer system 82A may be coupled to one or more other computer systems, e.g., the computer system 82B through one or more networks 84. The network 84 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. Also, the computer system 82A and the computer system 82B may each be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

In some embodiments the computer system 82B may receive the enhanced image created by the graphical programming development environment on the computer system 82A via the network 84. In some embodiments a conventional web browser or other software application which traditionally cannot display graphical programs (due to the graphical programs being packaged in a file format which the web browser cannot read) may execute on the computer system 82B to receive the enhanced image. In an embodiment in which the graphical programming development environment creates the enhanced image according to a standard image format commonly used by many software applications (such as the PNG image format, for example), the web browser or other software application may be able to display the enhanced image using the pixel information included in the enhanced image, e.g., in the same manner that the web browser or other software application would display normal images that do not include graphical program information. The web browser or other software application may simply ignore the graphical program information included in the enhanced image.

As noted above, in some embodiments the graphical programming development environment may create the pixel information of the image in such a way that when the pixel information is displayed by the web browser or other software application, the image has an appearance substantially similar to or identical to the appearance of the graphical program's block diagram. This may effectively enable the user of the computer system 82B to see the graphical program (or more precisely, to see an image of the graphical program's block diagram) without requiring the graphical program to be opened in the graphical programming development environment. If the user of the computer system 82B then decides that he wants to use the graphical program in the graphical programming development environment, he may provide the enhanced image to the graphical programming development environment software 205 executing on the computer system 82B. The graphical programming development environment may then extract the graphical program information encapsulated within the enhanced image, and may use the graphical program information to open or instantiate the graphical program in a block diagram editor of the graphical programming development environment, e.g., so that the user can edit or execute the graphical program.

Figure 3:
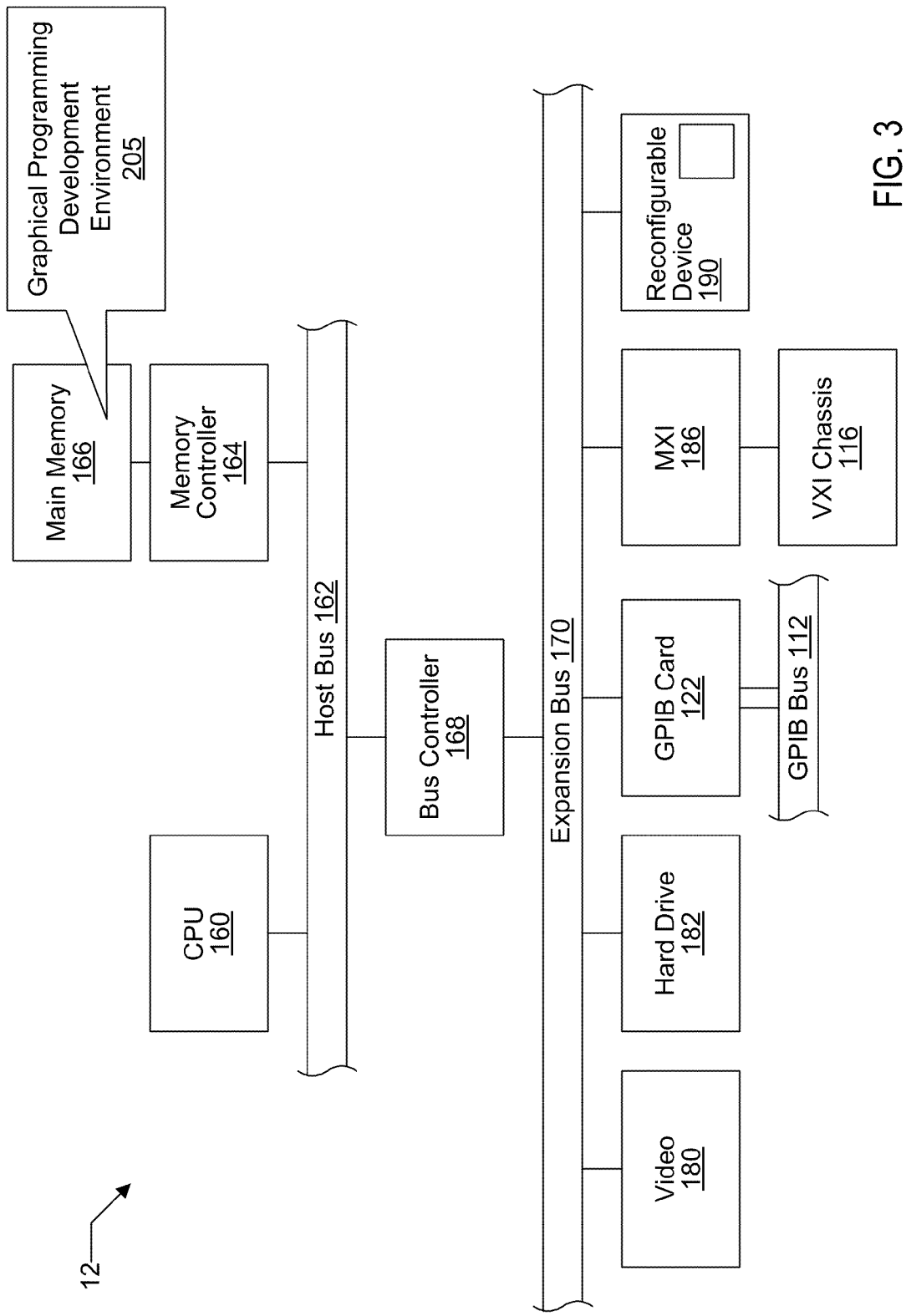
FIG. 3 is a block diagram representing an example embodiment of the computer systems illustrated in FIGS. 1 and 2.

FIG. 3 is a block diagram representing one embodiment of the computer system 82A and/or 82B. It is noted that any type of computer system configuration or architecture can be used as desired, and FIG. 3 illustrates a representative PC embodiment. It is also noted that the computer systems 82A and 82B may be general purpose computer systems, portable computing devices, computers implemented on a card installed in a chassis, or other types of devices. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical programming development environment which creates an enhanced image encapsulating a graphical program and/or instantiates a graphical program using an enhanced image, as described herein. The main memory 166 may also store the graphical program from which the enhanced image is created. The main memory may also store an enhanced image, e.g., one received through a network from another computer system. The main memory 166 may also store one or more software applications other than the graphical programming development environment which can display the enhanced image using its pixel information. The main memory 166 may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer in some embodiments. The device 190 may include a processor and memory which may execute a real time operating system. The device 190 may also or instead comprise a programmable hardware element. In some embodiments the computer system may be operable to deploy a graphical program to the device 190 for execution of the graphical program on the device 190. The deployed graphical program may take the form of graphical program instructions or data structures that directly represent the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Example Systems

In some embodiments, the graphical programming development environment may be specialized for creating graphical programs that perform test and/or measurement functions; controlling and/or modeling of instrumentation or industrial automation hardware; modeling and simulation functions, e.g., modeling or simulating a device or product being developed or tested, etc. Examples of test applications where the graphical programs may be used include hardware-in-the-loop testing and rapid control prototyping, among others.

However, it is noted that the graphical programs created by the graphical programming development environment may be used for a plethora of applications and are not limited to the above applications. For example, the graphical programs may be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 4A:
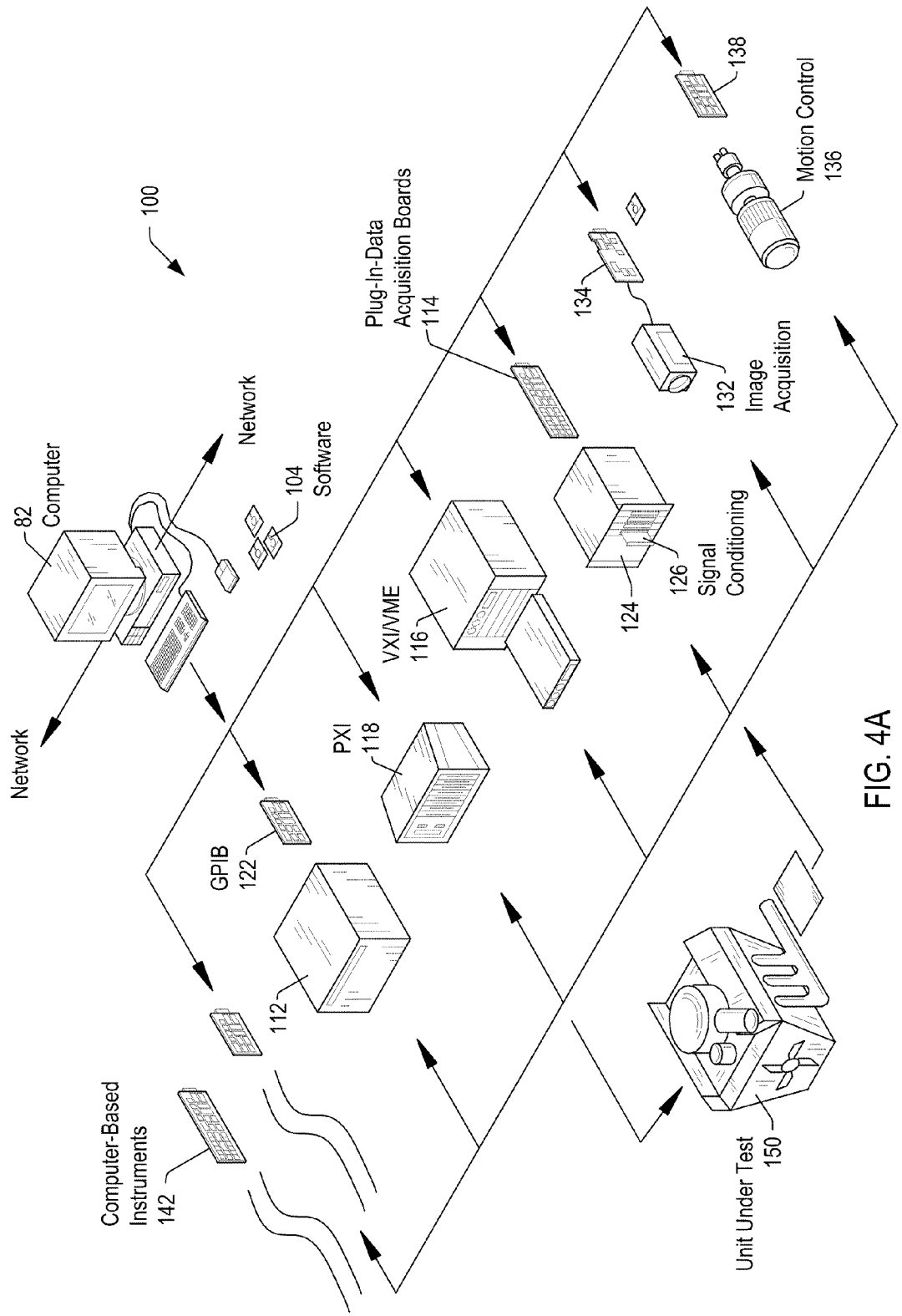
FIG. 4A illustrates an example of an instrumentation control system in which the computer systems of FIG. 1 or FIG. 2 may be used in some embodiments.

FIG. 4A illustrates an exemplary instrumentation control system 100 which may be implemented in some embodiments. The system 100 comprises a host computer 82 which couples to one or more instruments. The host computer 82 may include a CPU, a display device, memory, and one or more input devices such as a mouse or keyboard as shown. The computer 82 may operate with the one or more instruments to analyze, measure or control a unit under test (WUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (WUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 4B:
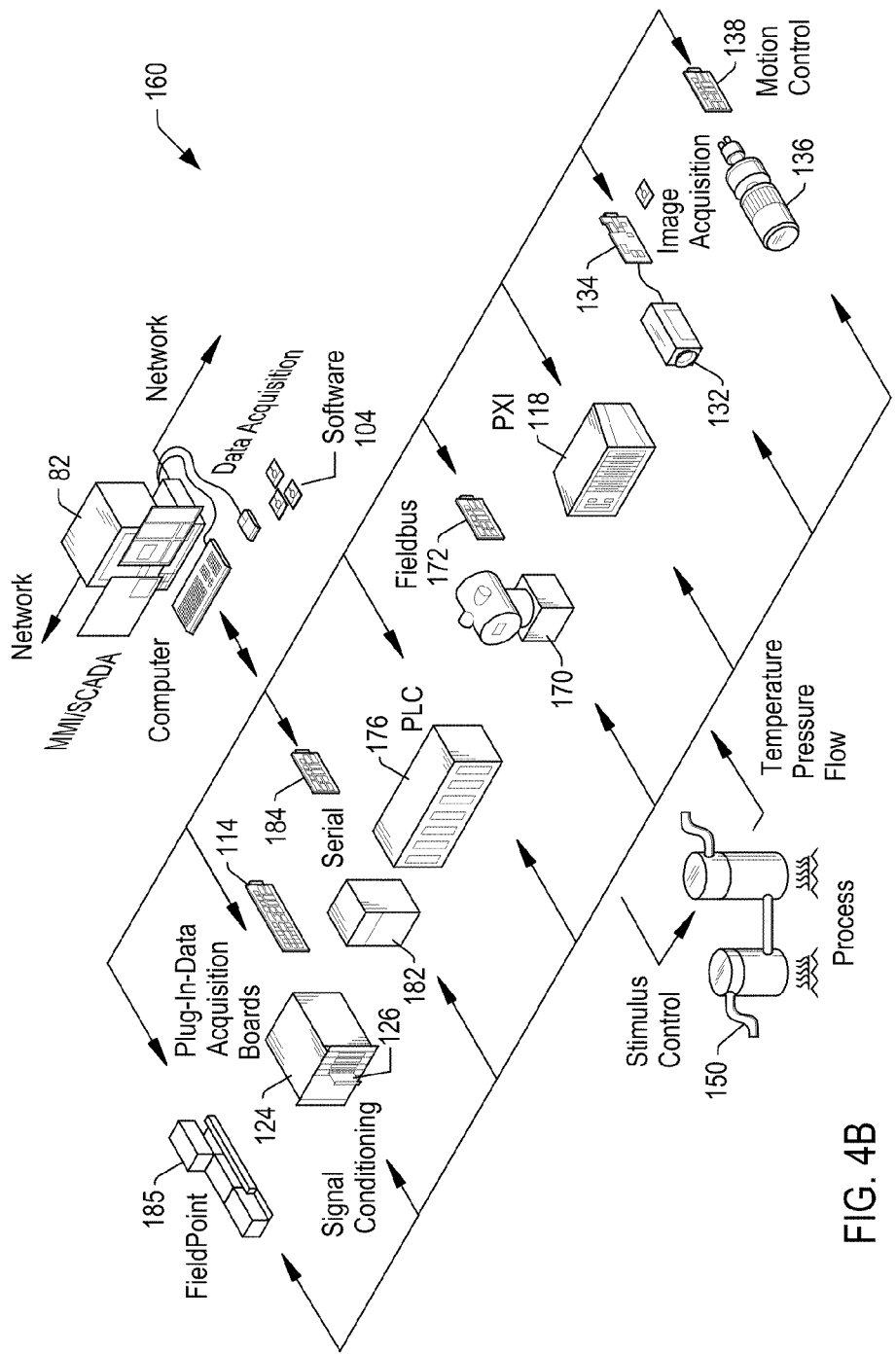
FIG. 4B illustrates an example of an industrial automation system in which the computer systems of FIG. 1 or FIG. 2 may be used in some embodiments.

FIG. 4B illustrates an exemplary industrial automation system 160 which may be implemented in some embodiments. The industrial automation system 160 is similar to the instrumentation or test and measurement system 100 shown in FIG. 4A. Elements which are similar or identical to elements in FIG. 4A have the same reference numerals for convenience. The system 160 may include a computer 82 which couples to one or more devices or instruments. The computer 82 may include a CPU, a display device, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 5A is a high level block diagram of an exemplary system which may execute or utilize graphical programs. FIG. 5A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

FIG. 5B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In some embodiments, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In some embodiments, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 4A, 4B, and 5B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 4A and 4B, may be referred to as virtual instruments.

Figure 6:
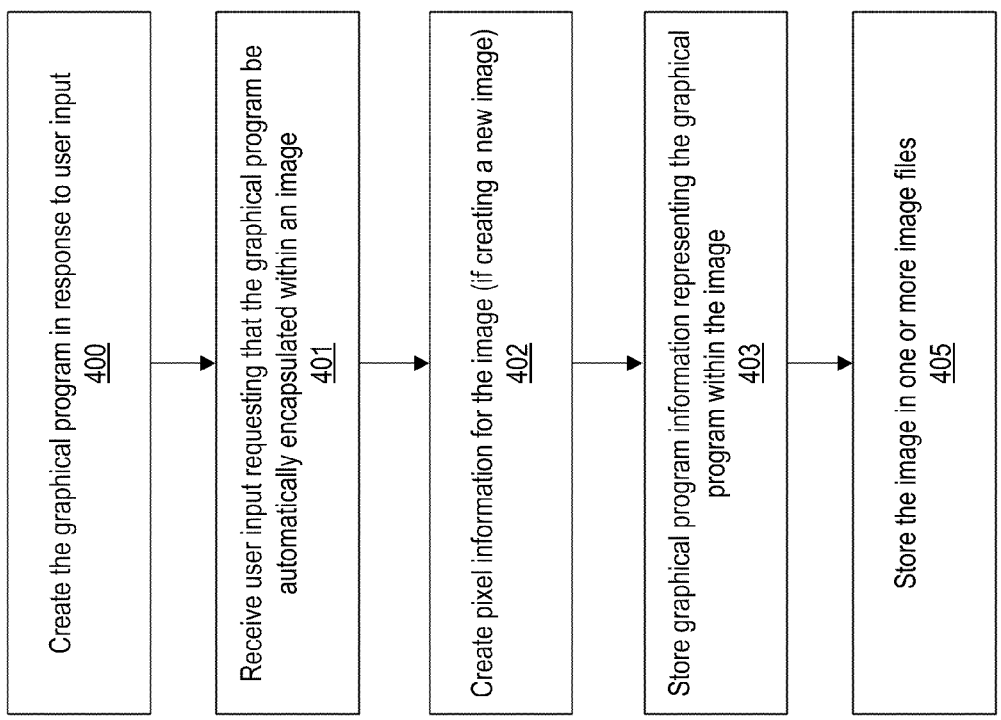
FIG. 6 is a flowchart diagram illustrating one embodiment of a method for creating an enhanced image which encapsulates a graphical program.

FIG. 6 is a flowchart diagram illustrating one embodiment of a method for creating an enhanced image which encapsulates a graphical program. The method may be implemented by the graphical programming development environment 205 executing on a computer system, e.g., the computer system 82.

As indicated in block 400, the graphical programming development environment may create the graphical program in response to user input to a block diagram editor. The graphical program may be created or assembled in response to the user arranging on a display of the computer system 82 a plurality of nodes or icons, and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates functionality performed by the graphical program when executed. The plurality of interconnected nodes may be included in a block diagram. In some embodiments the graphical program may also include a user interface portion or front panel portion. Where the graphical program includes a user interface portion, the user may optionally assemble the user interface on the display. As one example, the user may use the LabVIEW graphical programming development environment to create the graphical program.

As indicated in block 401, the graphical programming development environment may receive user input requesting that the graphical program be automatically encapsulated within an image. In some embodiments the image may be an existing image, i.e., an image which already exists at the time the request is received in block 401. The existing image may include pixel information for rendering the image on a display device, but without initially including graphical program information representing a graphical program. In other words, the existing image may simply be a normal image.

In other embodiments the user may request that the graphical program be automatically encapsulated within a new image that does not exist yet. In this case the graphical programming development environment may create pixel information for the image as indicated in block 402, and may store the pixel information in a data structure representing the image. The pixel information is the information which defines how the image will appear when displayed on a display device. The pixel information may include raster or bitmap information representing pixels of the image. For example, the pixel information may specify a color or luminance value which should be displayed for each pixel of the image. In some embodiments the pixel information stored in the image may be in the same format used for storing video information in the video memory of the computer system. In other embodiments the pixel information may be in the form of a device-independent bitmap.

In various embodiments the graphical programming development environment may create pixel information for the image such that the image will have any of various appearances when the image is subsequently displayed. In some embodiments the appearance of the image may be substantially based on the appearance of the block diagram of the graphical program. When the block diagram of the graphical program is displayed by the graphical programming development environment, the user can see the nodes of the graphical program and the interconnections among the nodes. Thus, for example, in some embodiments the image may have a substantially similar or identical appearance which also enables the user to see the nodes and their interconnections by viewing the image.

In some embodiments the appearance of the image may be based on the appearance of the actual block diagram, but the appearance of the image may be altered somewhat compared to the appearance of the actual block diagram. For example, in some embodiments the graphical programming development environment may include additional pixel information in the image representing additional elements beyond the elements which appear in the block diagram, such as one or more elements which visually indicate to the user that the image is an enhanced image which encapsulates the graphical program. For example, the graphical programming development environment may include additional pixel information in the image which appears as text or icons when the additional pixel information is displayed, e.g., in order to convey to the user that the graphical program is encapsulated within the image.

In other embodiments the graphical programming development environment may create pixel information for the image such that when the image is displayed, one or more of the elements in the graphical program's block diagram appear differently in the image than how they appear when the actual block diagram is displayed in the graphical programming development environment. For example, when the image is displayed, various elements of the block diagram (e.g., nodes or wires connecting the nodes) may appear with altered colors, altered icons, altered sizes, etc.

In other embodiments the graphical programming development environment may create pixel information for the image such that the image has a substantially different appearance from the appearance of the block diagram. For example, in some embodiments the appearance of the image may not be based on the appearance of the block diagram at all. For example, in some embodiments the user may select to encapsulate the graphical program within an existing image that includes pixel information depicting a drawing, illustration, or photograph.

In some embodiments the graphical programming development environment may create pixel information for the image such that the image has a similar or identical display size as the size of the block diagram when it is displayed in the block diagram editor of the graphical programming development environment. For example, if the displayed block diagram is 200 pixels in width and 175 pixels in height then the image size may also be 200×175 pixels (or close to that size). In other embodiments the display size of the image may be substantially different from the display size of the block diagram. For example, in some embodiments the graphical programming development environment may create pixel information representing a shrunken version of the appearance of the block diagram. For example, in some embodiments the graphical programming development environment may create a small icon-sized image based on the appearance of the block diagram or based on the appearance of a portion of the block diagram.

Figure 7:
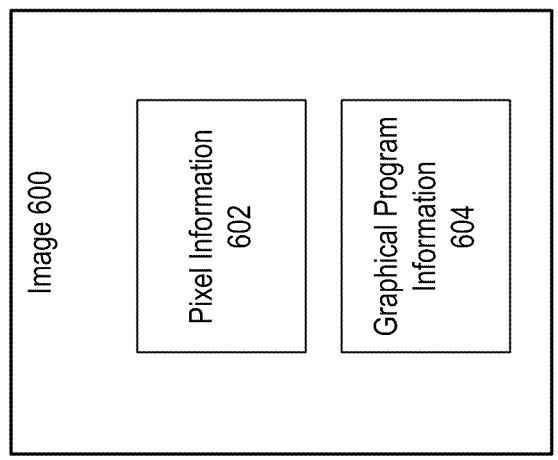
FIG. 7 illustrates an example of an enhanced image which includes both pixel information and graphical program information representing a graphical program.

As indicated in block 403, the graphical programming development environment may also store graphical program information representing the graphical program within the image, e.g., within the data structure representing the image. Thus, the image data structure includes both the pixel information which defines how the image will appear when displayed and the graphical program information. FIG. 7 illustrates an example of an image 600 which includes both pixel information 602 and graphical program information 604.

The graphical program information may include information specifying the plurality of interconnected nodes of the graphical program. The graphical program information included in the image may enable another instance of the graphical programming development environment executing on a different computer system to create or instantiate a fully editable and executable version of the graphical program in response to receiving the image. In various embodiments the graphical program information may be stored in any of various formats. In some embodiments the graphical program information may include binary data, such as data structures stored in binary form representing the plurality of interconnected nodes of the graphical program, the configuration of the nodes, the interconnections among the nodes, etc. In other embodiments the graphical program information may include text data, such as XML text or text in another markup language describing the graphical program.

As indicated in block 405, in some embodiments the graphical programming development environment may then store the image in one or more image files. For example, one or more data structures representing the image may be stored in the main memory 166 of the computer system 82. The graphical programming development environment may then write these one or more data structures to one or more files representing the image, e.g., by storing the one or more files on the disk drive 182 or other persistent storage device of the computer system 82.

In various embodiments the graphical programming development environment may store the image according to any of various image file formats. In some embodiments the graphical programming development environment may store the image in a standard image file format commonly supported by conventional web browsers, email viewers, word processors, or other typical software applications installed on most computer systems. In such an embodiment the standard image file format which is used needs to support storing additional information in the image other than just the pixel information so that the graphical program information can be stored in the image file. For example, in some embodiments the image may be stored as a Portable Network Graphics (PNG) file. The PNG image file format allows for additional information other than pixel information to be stored in an image.

After the enhanced image including the graphical program information has been created, the user may share the enhanced image with other users. For example, in some embodiments the user may upload the enhanced image to a web server, email server, or other computer server, and a second user may then download the image to another computer system.

Figure 8:
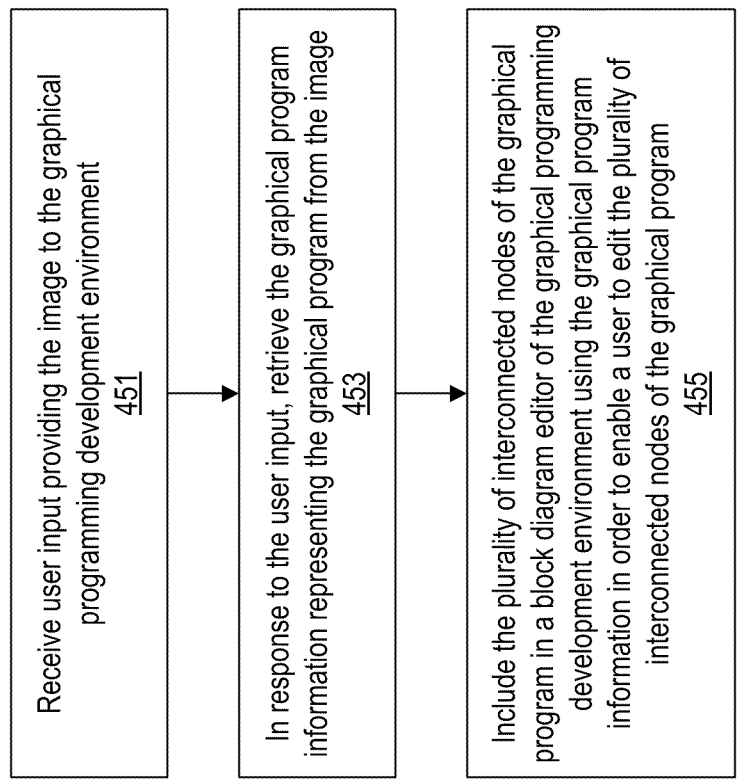
FIG. 8 is a flowchart diagram illustrating one embodiment of a method for using the enhanced image to instantiate the graphical program on another computer system.

FIG. 8 is a flowchart diagram illustrating one embodiment of a method for using the downloaded image to instantiate the graphical program on the second user's computer system. The method may be implemented by the graphical programming development environment software 205 executing on the second user's computer system.

As indicated in block 451, the graphical programming development environment may receive user input providing the image to the graphical programming development environment. For example, in some embodiments the second user may use a conventional web browser application or other software application different from the graphical programming development environment to download and view the enhanced image. The user may then provide user input transferring the image from the web browser or other software application to the graphical programming development environment. In some embodiments the user may transfer the image to the graphical programming development environment by using a standard user interface drag-and-drop technique to drag the image from the web browser or other software application into a window of the graphical programming development environment. The graphical programming development environment may be configured to receive a notification or programmatic event indicating that the user dropped the image into the graphical programming development environment. In other embodiments the user may use other techniques to transfer the image from the web browser or other software application into the graphical programming development environment. For example, in some embodiments the user may save the image to a file on the hard disk of the computer and then select the file using a menu option of the graphical programming development environment in order to provide the image to the graphical programming development environment.

In response to the user input providing the image to the graphical programming development environment, the graphical programming development environment may analyze the image in order to check whether the image is an enhanced image that includes graphical program information representing a graphical program. In response to determining that the image does include graphical program information, the graphical programming development environment may retrieve or extract the graphical program information from the image, as indicated in block 453.

As indicated in block 455, the graphical programming development environment may then use the graphical program information to automatically create or instantiate the graphical program. For example, the graphical programming development environment may automatically include or display the plurality of interconnected nodes of the graphical program in a block diagram editor of the graphical programming development environment. In some embodiments the resulting block diagram is not merely an image of the graphical program, but is a fully editable and/or executable version of the graphical program, e.g., such that the user can edit and/or execute the plurality of interconnected nodes of the graphical program. For example, after the graphical program has been automatically instantiated by the graphical programming development environment using the graphical program information encapsulated within the image, the user may be able to edit the graphical program by performing such actions as: selecting new nodes to add to the graphical program from palettes or menus provided by the graphical programming development environment; reconfiguring wires or interconnections among the nodes of the graphical program using a wiring tool provided by the graphical programming development environment; interacting with node configuration user interfaces to change the configuration of nodes in the graphical program; etc. The user may also be able to select a menu item or button to request the graphical programming development environment to compile and/or execute the graphical program.

In some embodiments of block 455 the graphical programming development environment may instantiate the graphical program encapsulated by the enhanced image as a new graphical program. For example, the graphical program may create a new, empty graphical program and then automatically include the nodes of the encapsulated graphical program within the new graphical program. In other embodiments the graphical programming development environment may instantiate the graphical program encapsulated in the enhanced image by including the graphical program within another graphical program that already exists. For example, in some embodiments, if the user drags-and-drops the enhanced image into a block diagram editor window in which another open graphical program is currently displayed, the graphical programming development environment may add the graphical program encapsulated by the enhanced image to the graphical program that is already open. In other embodiments the graphical programming development environment may prompt the user to select whether to add the graphical program encapsulated by the enhanced image to the graphical program that is already open, or to instantiate the graphical program encapsulated by the enhanced image as a new, separate graphical program. In some embodiments, if the user selects to add the encapsulated graphical program to the graphical program that is already open, the user may also be able to select a particular location within the block diagram of the open graphical program for the nodes of the encapsulated graphical program to be added.

Figure 9:
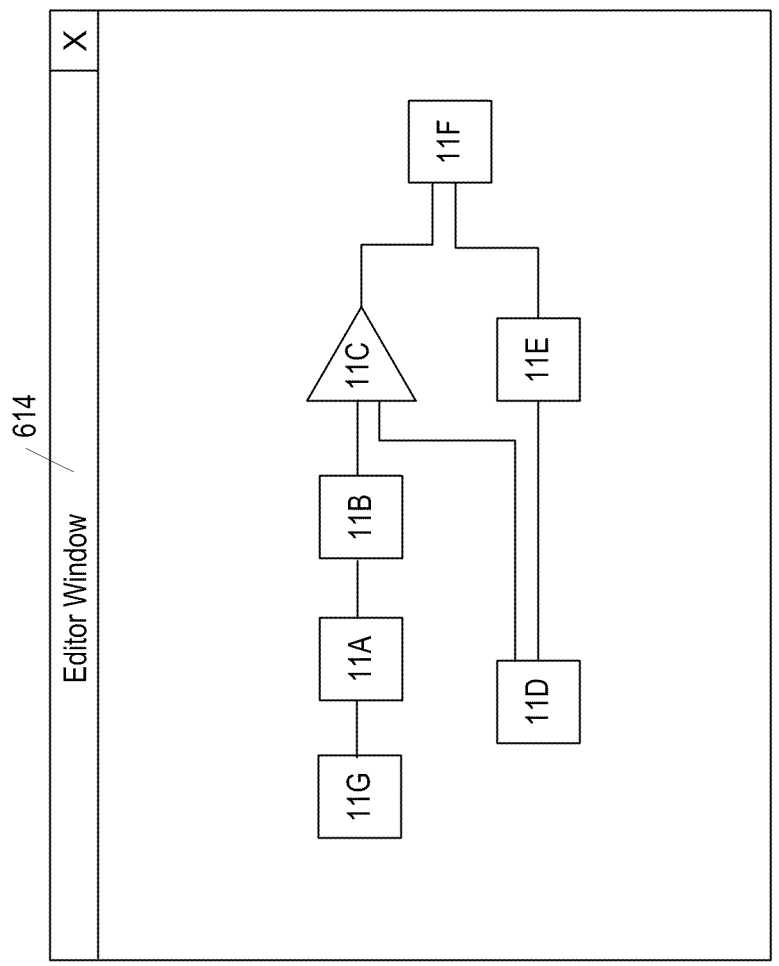
FIG. 9 illustrates an example of a simple graphical program.

FIG. 9 illustrates an example of a simple graphical program displayed in a block diagram editor window 614 of a graphical programming development environment. The graphical program includes a plurality of interconnected nodes 11A-G visually indicating functionality of the graphical program. (In this simple example, the nodes 11 have a plain appearance, but in a typical real-world example the nodes may have names and/or a graphical iconic appearance indicating the particular function each node is configured to perform.)

Figure 10:
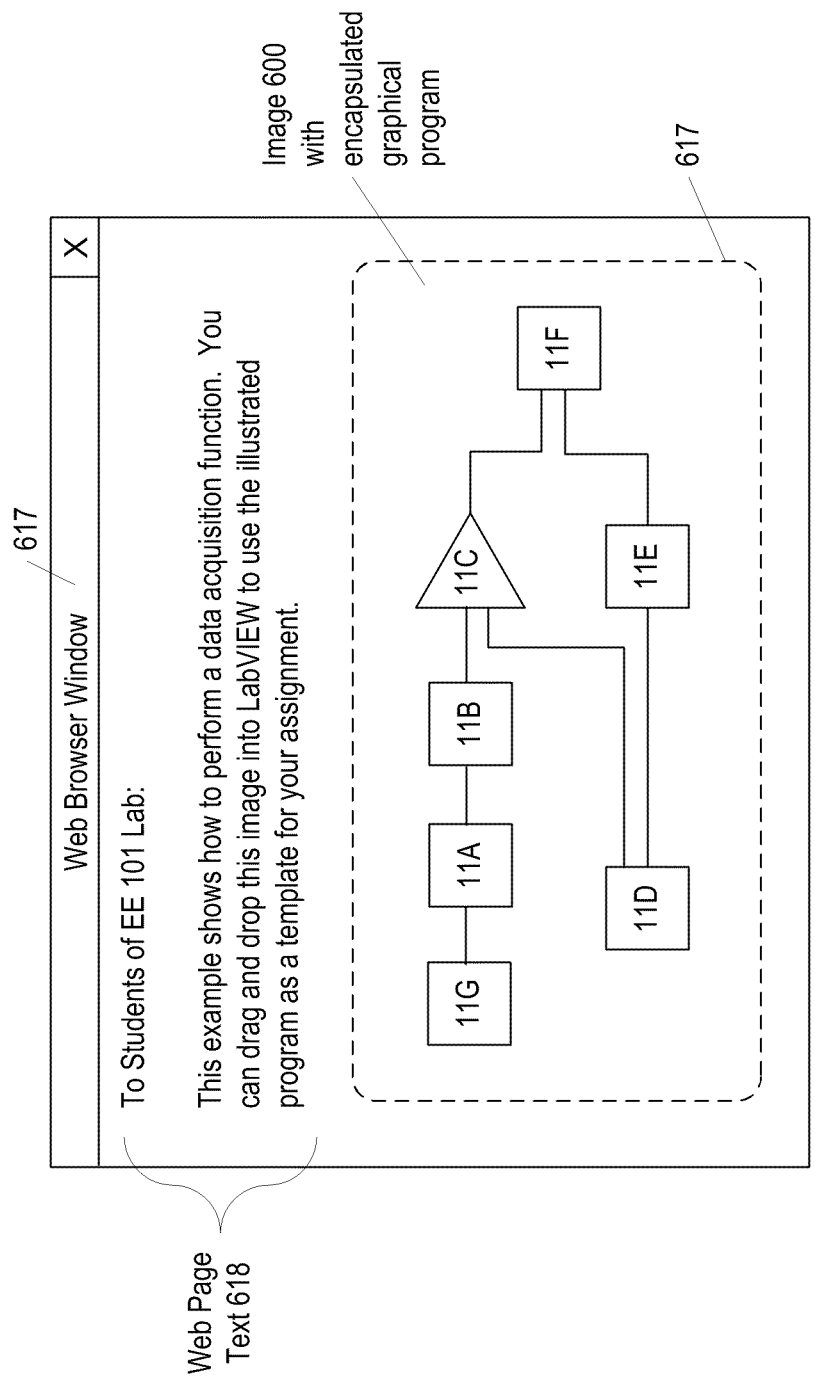
FIG. 10 illustrates an example in which an image encapsulating the graphical program of FIG. 9 is displayed in a web page.

FIG. 10 illustrates an example of an enhanced image 600 automatically created by the graphical programming development environment from the graphical program of FIG. 9. In this example the enhanced image 600 has been downloaded in a web page displayed within a window 617 of a web browser application. For example, as indicated by the web page text 618, a professor teaching an electrical engineering course may have created the enhanced image 600 and uploaded it to a class website in a web page. The students of the class can download the web page and view the enhanced image 600 in a standard web browser. In this example the enhanced image 600 has an appearance very similar to the appearance of the graphical program is illustrated in FIG. 9. Notice however that in addition to the plurality of interconnected nodes of the graphical program, the image also includes a dashed rectangle 617 surrounding the nodes. This may visually indicate to the students that the image is an enhanced image which encapsulates a graphical program.

Although the enhanced image 600 displayed within the web browser appears very similar to the graphical program illustrated in FIG. 9, the web browser may not be able to directly edit or execute the graphical program portrayed by the enhanced image 600 since it is only the pixel information of the enhanced image which is actually being displayed by the web browser. However, after downloading and viewing the web page, the students may drag-and-drop the enhanced image 600 into the graphical programming development environment applications executing on their computers in order to cause the graphical program encapsulated within the image to be automatically extracted and instantiated in their graphical programming development environment applications. The students may then be able to edit and/or execute the instantiated graphical program from within the graphical programming development environment applications executing on their computers.

In the example of FIG. 10, the entire graphical program of FIG. 9 was encapsulated within the enhanced image 600. In other embodiments a graphical program encapsulated within an enhanced image may originally have been part of a larger graphical program. For example, the plurality of interconnected nodes specified by the graphical program information in the image may originally be a subset of a larger set of interconnected nodes.

Figure 11:
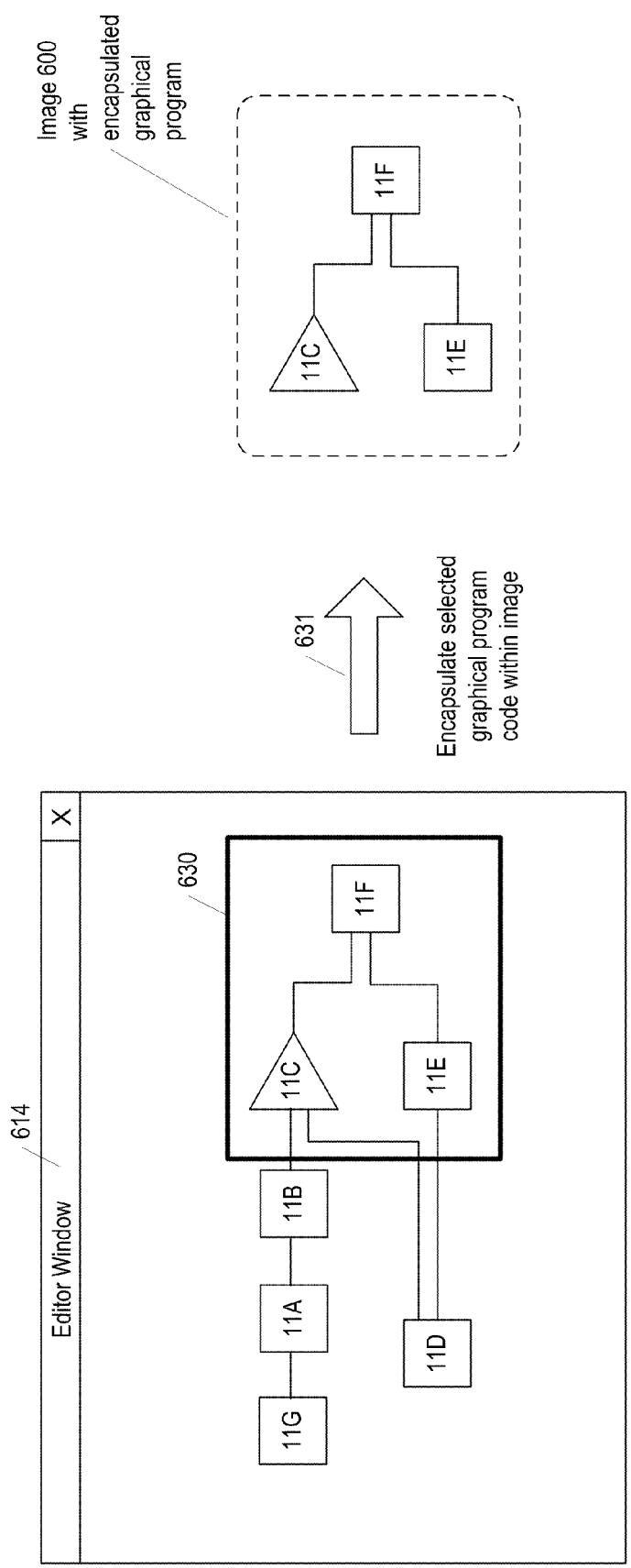
FIG. 11 illustrates an example in which a user selects a portion of a graphical program to be encapsulated within an image.

For example, a user may select part of a larger graphical program and request only the selected part to be encapsulated within the image. The selected part may thus define the graphical program to be included in the image. In various embodiments, the user may select the desired part using any of various techniques. FIG. 11 illustrates an example in which a user has used a pointing device to draw a rectangle 630 around the nodes 11C, 11E and 11F. As indicated by the arrow 631, the user may then request the selected nodes within the rectangle 630 to be automatically encapsulated in an image. The right side of FIG. 11 illustrates an appearance of the resulting enhanced image 600 when it is displayed according to one embodiment.

Figure 12:
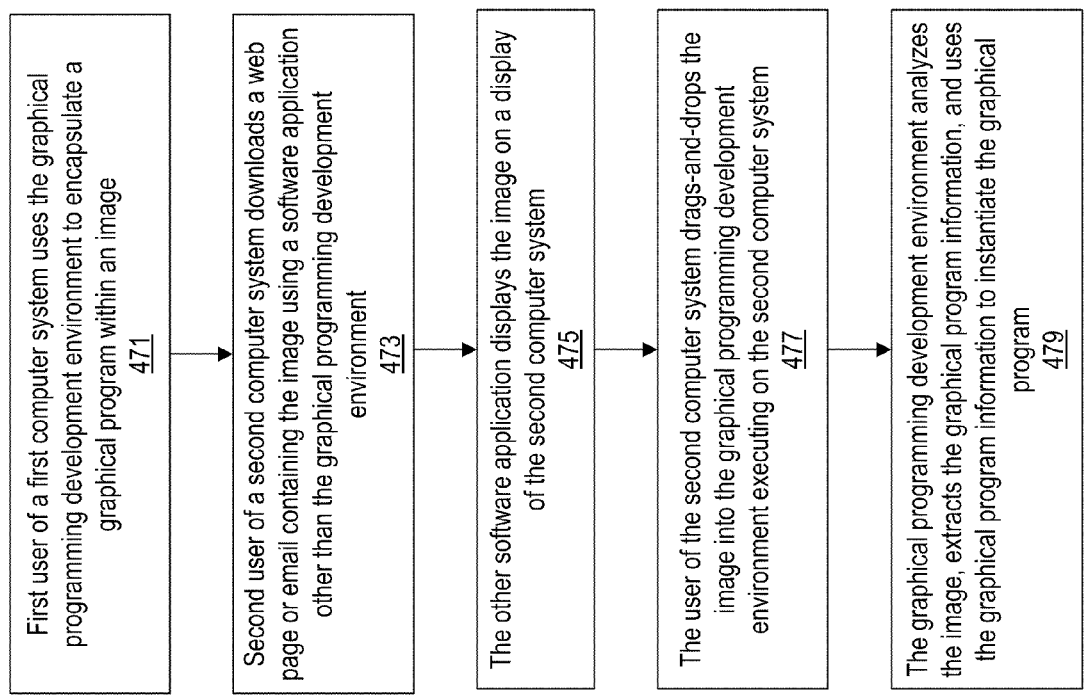
FIGS. 12 and 13 are flowchart diagrams illustrating example uses of enhanced images which encapsulate graphical programs.

FIG. 12 is a flowchart diagram illustrating a further use of an enhanced image according to some embodiments.

In block 471, a first user of a first computer system uses the graphical programming development environment to encapsulate a graphical program within an image.

In block 473, a second user of a second computer system downloads a web page, email or other item containing the image using a web browser, email viewer, or other software application other than the graphical programming development environment.

In block 475, the web browser, email viewer, or other software application displays the image on a display of the second computer system.

In block 477 the user of the second computer system drags-and-drops the image from the web browser, email viewer, or other software application into the graphical programming development environment executing on the second computer system, or performs other input to provide the image to the graphical programming development environment.

In block 479, the graphical programming development environment automatically analyzes the image, extracts the graphical program information, and uses the graphical program information to instantiate the graphical program so that the user can edit and/or execute the graphical program.

Figure 13:
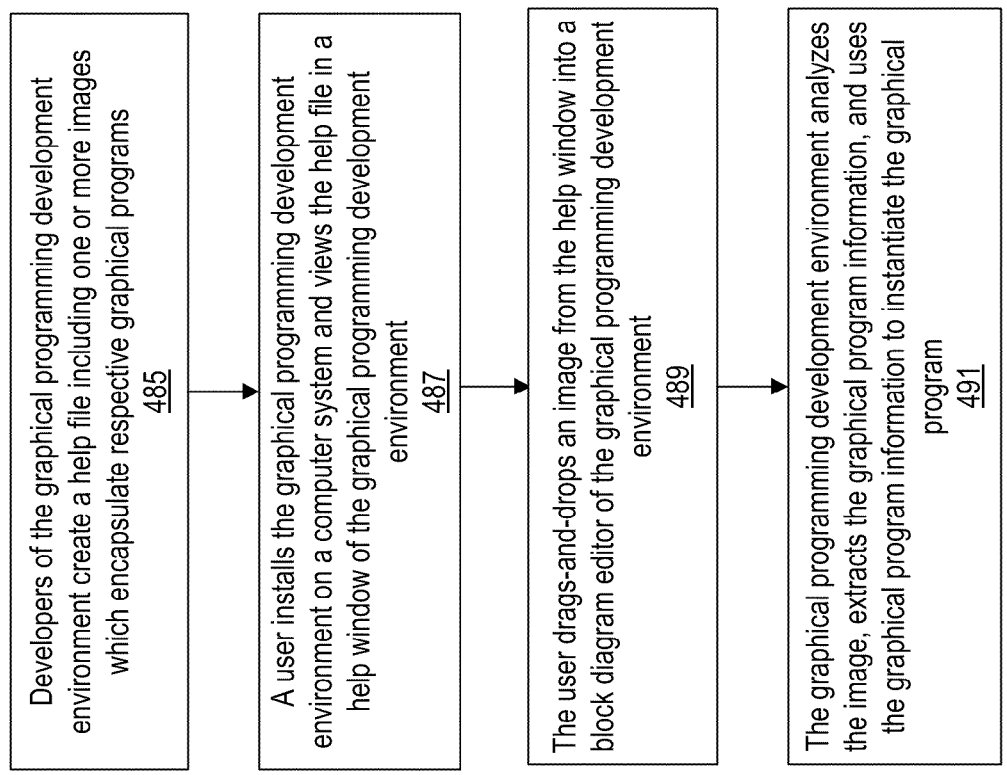

FIG. 13 is a flowchart diagram illustrating a further use of an enhanced image according to some embodiments.

In block 485, developers of the graphical programming development environment may create help documentation including one or more enhanced images which encapsulate respective graphical programs. For example, the help documentation may provide a tutorial explaining how to accomplish certain graphical programming tasks. The enhanced images may include illustrations of graphical programs or graphical code portions that show users which graphical program nodes to use, how to configure the nodes, and how to connect the nodes to each other to accomplish the graphical programming tasks.

In block 487, a user may install the graphical programming development environment on a computer system. The help documentation may be installed along with the graphical programming development environment. The user may subsequently view the help documentation, e.g., in order to learn how to accomplish the particular graphical programming tasks discussed in the help documentation. The help documentation may be displayed within a help window of the graphical programming development environment or within a separate help document.

In block 489, the user may drag-and-drop an enhanced image from the help window or help document into a block diagram editor of the graphical programming development environment, e.g., in order to use the graphical program or graphical program portion illustrated by the enhanced image in the user's own graphical program. In other embodiments the user may provide the enhanced image to the graphical programming development environment in other ways besides dragging-and-dropping it.

In block 491, the graphical programming development environment may automatically detect that the user dropped the enhanced image into the block diagram editor. The graphical programming development environment may then automatically analyze the enhanced image, extract the graphical program information included therein, and use the graphical program information to instantiate the graphical program so that the user can edit and/or execute the graphical program.

It is noted that an enhanced image which encapsulates a graphical program may be used in or included in any of various other kinds of documents. For example, a first user may use the graphical programming development environment to create an enhanced image which encapsulates a graphical program, and may then include the enhanced image in a document created by a word processor application. The first user may then email the document to a second user. The second user may use the word processor application on his own computer to open the document and view the enhanced image within the document. The second user may then drag-and-drop the enhanced image into the graphical programming development environment executing on his own computer (or perform other input to provide the enhanced image to the graphical programming development environment) in order to cause the graphical programming development environment to automatically instantiate an editable, executable version of the graphical program encapsulated by the enhanced image.

It is further noted that in some embodiments a graphical program may be encapsulated within other types of objects or files besides images. For example, in some embodiments the graphical programming development environment may be configured to automatically encapsulate a graphical program within various types of documents that can be handled by common software applications. The term "document" is used herein to refer to a file or object whose primary purpose is to convey textual information, e.g., such that the textual information can be printed or displayed on a computer monitor in the form of separate pages. Examples of documents include files created by word processor software applications (such as Microsoft Word files, for example), Portable Document Format (PDF) files, and certain HTML files or other markup language files which convey textual information. In some embodiments, instead of first encapsulating a graphical program within an image that can be included within a document, the graphical programming development environment may embed the graphical program directly within the document. For example, the document may not include any images at all, but may still encapsulate the graphical program.

As an example, consider a document created according to a particular document format supported by a particular word processor application or document viewer application. The document may contain textual information specifying the text of the document. In response to a request by a user to embed a graphical program within the document, the graphical programming development environment may create graphical program information representing the graphical program, e.g., in the form of binary data structures or text information describing the graphical program. The graphical programming development environment may then embed the graphical program information in the document so that the document includes the original text information as well as the graphical program information.

The user may then email or transmit the document to another user. The other user may open the document using the word processor application or document viewer application with which the document is associated. The word processor application or document viewer application may ignore the graphical program information embedded in the document and simply display the text information as usual. However, when the other user provides the document to the graphical programming development environment executing on his computer (e.g., by dragging-and-dropping an icon representing the document into the graphical programming development environment, or by using a menu command of the graphical programming development environment to request that the document be opened), the graphical programming development environment may automatically analyze the document to determine that the document includes the graphical program information representing the graphical program. The graphical programming development environment may then use the graphical program information to automatically instantiate an editable, executable version of the graphical program.

It is further noted that in some embodiments the graphical programming development environment may be operable to encapsulate multiple graphical programs within a single image, document, or other object. In some embodiments if the object encapsulating the multiple graphical programs is then provided to another instance of the graphical programming development environment on another computer, the graphical programming development environment may automatically instantiate each of the encapsulated graphical programs. In other embodiments, the graphical programming development environment may display information indicating that multiple graphical programs are encapsulated in the object, and may prompt the user to select which of the graphical program(s) he wants to be instantiated. In some embodiments, if multiple graphical programs are instantiated then each of the graphical programs may be instantiated as separate block diagrams. In other embodiments, two or more of the graphical programs may be combined into a single graphical program or block diagram when they are instantiated.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-accessible memory medium storing program instructions executable to:
   receive first user input requesting to encapsulate a graphical program within an image, wherein the graphical program includes a plurality of interconnected nodes visually indicating functionality of the graphical program;
   in response to the first user input, store graphical program information representing the graphical program within the image, wherein the graphical program information includes information specifying the plurality of interconnected nodes, wherein in addition to the graphical program information the image also includes pixel information for displaying the image; and
   store the image in at least one image file by:
      storing the pixel information for displaying the image in the at least one image file; and
      storing the graphical program information representing the graphical program in the at least one image file.

2. The non-transitory computer-accessible memory medium of claim 1,
   wherein the graphical program and the at least one image file are created by a graphical programming development environment software application;
   wherein the at least one image file is created according to a standard image format commonly displayable by software applications other than the graphical programming development environment software application.

3. The non-transitory computer-accessible memory medium of claim 1,
   wherein the graphical program and the at least one image file are created by a graphical programming development environment software application;
   wherein the at least one image file is displayable by one or more of:
      a web browser software application;
      an email viewer software application;
      a word processor software application.

4. The non-transitory computer-accessible memory medium of claim 1, wherein the program instructions are further executable to:
   receive second user input providing the image to a graphical programming development environment;
   in response to the second user input, automatically retrieve the graphical program information representing the graphical program from the image; and
   automatically include the plurality of interconnected nodes of the graphical program in a block diagram editor of the graphical programming development environment using the graphical program information, wherein including the plurality of interconnected nodes of the graphical program in the block diagram editor enables a user to edit the plurality of interconnected nodes of the graphical program.

5. The non-transitory computer-accessible memory medium of claim 4,
   wherein the program instructions are executable to receive the second user input providing the image to the graphical programming development environment by receiving user input requesting to transfer the image from a help window of the graphical programming development environment to the block diagram editor of the graphical programming development environment.

6. The non-transitory computer-accessible memory medium of claim 5,
wherein the program instructions are executable to receive the user input requesting to transfer the image from the help window to the block diagram editor by receiving user input dragging-and-dropping the image from the help window to the block diagram editor.

7. The non-transitory computer-accessible memory medium of claim 4,
wherein the program instructions are executable to receive the second user input providing the image to the graphical programming development environment by receiving user input providing the image to the graphical programming development environment from a software application other than the graphical programming development environment.

8. The non-transitory computer-accessible memory medium of claim 7,
wherein the program instructions are executable to receive the user input providing the image to the graphical programming development environment from the software application other than the graphical programming development environment by receiving user input providing the image to the graphical programming development environment from one or more of:
a web browser software application;
an email software application.

9. The non-transitory computer-accessible memory medium of claim 4,
wherein the program instructions are executable to receive the second user input providing the image to the graphical programming development environment by receiving user input dragging-and-dropping the image into the graphical programming development environment from a software application other than the graphical programming development environment.

10. The non-transitory computer-accessible memory medium of claim 4,
wherein the program instructions are executable to receive the second user input providing the image to the graphical programming development environment by receiving user input specifying the at least one image file.

11. The non-transitory computer-accessible memory medium of claim 4, wherein the program instructions are further executable to:
in response to the second user input providing the image to the graphical programming development environment, analyze the image to determine that the image includes the graphical program information representing the graphical program;
wherein the program instructions are executable to retrieve the graphical program information representing the graphical program from the image in response to determining that the image includes the graphical program information representing the graphical program.

12. The non-transitory computer-accessible memory medium of claim 4, wherein the program instructions are further executable to:
execute the plurality of interconnected nodes of the graphical program after including the plurality of interconnected nodes of the graphical program in the block diagram editor of the graphical programming development environment.

13. The non-transitory computer-accessible memory medium of claim 1,
wherein the first user input requesting to encapsulate the graphical program within the image comprises user input requesting to encapsulate the graphical program within an existing image, wherein the existing image already includes the pixel information for displaying the image.

14. The non-transitory computer-accessible memory medium of claim 1,
wherein the first user input requesting to encapsulate the graphical program within the image comprises user input requesting to create a new image that does not exist yet and encapsulate the graphical program within the new image;
wherein the program instructions are further executable to create the pixel information for displaying the image and store the pixel information within the image in response to the first user input.

15. The non-transitory computer-accessible memory medium of claim 14,
wherein the program instructions are further executable to display the plurality of interconnected nodes in a block diagram editor of a graphical programming development environment prior to receiving the first user input requesting to encapsulate the graphical program within the image, wherein the displayed plurality of interconnected nodes has a particular display appearance;
wherein the program instructions are executable to create the pixel information for displaying the image by creating pixel information having a display appearance based on the display appearance of the plurality of interconnected nodes.

16. The non-transitory computer-accessible memory medium of claim 15,
wherein the program instructions are executable to create the pixel information for displaying the image by creating pixel information having a display appearance that includes a visual representation of the plurality of interconnected nodes.

17. The non-transitory computer-accessible memory medium of claim 14,
wherein the program instructions are executable to create the pixel information for displaying the image by creating pixel information having a display appearance which visually indicates to a user that the image includes the graphical program information representing the graphical program.

18. The non-transitory computer-accessible memory medium of claim 1,
wherein the program instructions are executable to store the image in the at least one image file by storing the image in a Portable Network Graphics (PNG) file, wherein storing the image in the PNG file includes:
storing the pixel information for displaying the image in the PNG file; and
storing the graphical program information representing the graphical program in the PNG file.

19. The non-transitory computer-accessible memory medium of claim 1,
wherein the graphical program is a first graphical program, wherein the plurality of interconnected nodes of the graphical program is a first plurality of interconnected nodes;
wherein the first graphical program is part of a second graphical program, wherein the second graphical program includes a second plurality of interconnected nodes, wherein the first plurality of interconnected nodes is a subset of the second plurality of interconnected nodes;

wherein the program instructions are further executable to:
   display the second plurality of interconnected nodes of the second graphical program; and
   receive user input selecting the first plurality of interconnected nodes from the displayed second plurality of interconnected nodes;
wherein the program instructions are executable to receive the first user input requesting to encapsulate the first graphical program within the image subsequently to receiving the user input selecting the first plurality of interconnected nodes by receiving user input requesting to encapsulate the selected first plurality of interconnected nodes within the image.

20. The non-transitory computer-accessible memory medium of claim 1,
  wherein the graphical program is initially stored in a graphical program file;
  wherein the program instructions are executable to receive the first user input requesting to encapsulate the graphical program within the image by receiving user input selecting the graphical program file.

21. A computer-implemented method comprising:
  receiving first user input requesting to encapsulate a graphical program within an image, wherein the graphical program includes a plurality of interconnected nodes visually indicating functionality of the graphical program;
  in response to the first user input, storing graphical program information representing the graphical program within the image, wherein the graphical program information includes information specifying the plurality of interconnected nodes, wherein in addition to the graphical program information the image also includes pixel information for displaying the image; and
  storing the image in at least one image file, wherein storing the image in the at least one image file includes:
    storing the pixel information for displaying the image in the at least one image file; and
    storing the graphical program information representing the graphical program in the at least one image file.

22. The computer-implemented method of claim 21, further comprising:
  receiving second user input providing the image to a graphical programming development environment;
  in response to the second user input, automatically retrieving the graphical program information representing the graphical program from the image; and
  automatically including the plurality of interconnected nodes of the graphical program in a block diagram editor of the graphical programming development environment using the graphical program information, wherein including the plurality of interconnected nodes of the graphical program in the block diagram editor enables a user to edit the plurality of interconnected nodes of the graphical program.

23. A system comprising:
one or more processors; and
memory storing program instructions;
wherein the program instructions are executable by the one or more processors to:
  receive first user input requesting to encapsulate a graphical program within an image, wherein the graphical program includes a plurality of interconnected nodes visually indicating functionality of the graphical program;
  in response to the first user input, store graphical program information representing the graphical program within the image, wherein the graphical program information includes information specifying the plurality of interconnected nodes, wherein in addition to the graphical program information the image also includes pixel information for displaying the image; and
  store the image in at least one image file by:
    storing the pixel information for displaying the image in the at least one image file; and
    storing the graphical program information representing the graphical program in the at least one image file.

24. The system of claim 23,
wherein the program instructions are further executable by the one or more processors to:
  receive second user input providing the image to a graphical programming development environment;
  in response to the second user input, automatically retrieve the graphical program information representing the graphical program from the image; and
  automatically include the plurality of interconnected nodes of the graphical program in a block diagram editor of the graphical programming development environment using the graphical program information, wherein including the plurality of interconnected nodes of the graphical program in the block diagram editor enables a user to edit the plurality of interconnected nodes of the graphical program.

* * * * *